United States Patent
Kaga et al.

(10) Patent No.: US 8,144,386 B2
(45) Date of Patent: Mar. 27, 2012

(54) PARTICLES FOR DISPLAY MEDIA AND INFORMATION DISPLAY PANEL USING SAME

(75) Inventors: Norihiko Kaga, Kodaira (JP); Kazuya Murata, Hino (JP); Gaku Yakushiji, Higashiyamato (JP)

(73) Assignee: Bridgestone Corporation, Tokyo (JP)

( * ) Notice: Subject to any disclaimer, the term of this patent is extended or adjusted under 35 U.S.C. 154(b) by 106 days.

(21) Appl. No.: 12/441,402

(22) PCT Filed: Sep. 20, 2004

(86) PCT No.: PCT/JP2007/068293
§ 371 (c)(1),
(2), (4) Date: Mar. 26, 2009

(87) PCT Pub. No.: WO2008/035741
PCT Pub. Date: Mar. 27, 2008

(65) Prior Publication Data
US 2010/0014149 A1 Jan. 21, 2010

(30) Foreign Application Priority Data
Sep. 22, 2006 (JP) .................................. 2006-257145

(51) Int. Cl.
*G02B 26/00* (2006.01)
*G09G 3/34* (2006.01)
(52) U.S. Cl. ........................... 359/296; 345/107; 349/86
(58) Field of Classification Search .................. 359/296; 345/48, 85, 86, 103, 105, 107; 204/490, 204/613, 625; 430/32, 35; 257/98; 524/425, 524/430, 497; 445/24; 428/323; 313/504
See application file for complete search history.

(56) References Cited

U.S. PATENT DOCUMENTS 4,680,103 A * 7/1987 Beilin et al. .................. 359/296
5,466,554 A * 11/1995 Sacripante et al. ........ 430/109.4
(Continued)

FOREIGN PATENT DOCUMENTS
CN 1472583 A 2/2004
(Continued)

OTHER PUBLICATIONS

Notification of Second Office Action issued Jul. 29, 2011 in counterpart Chinese Patent Application No. 200780043234.2.

*Primary Examiner* — Loha Ben
(74) *Attorney, Agent, or Firm* — Sughrue Mion, PLLC

(57) ABSTRACT

There are provided particles for display media capable of properly controlling change in an amount of charge by heating and an information display panel, by using the particles for display media capable of eliminating a display failure and reduction in contrast ratio. The present invention are particles for display media used for an information display panel, in which at least one kind of display media constituted as a group of particles including chargeable particles are sealed between two opposed substrates, at least one of two substrates being transparent, and in which the display media are made to move so as to display information, wherein two or more kinds of charge control agents (CCA) are contained in at least one kind of particles for display media, at least one kind of charge control agent is positively chargeable and at least one kind of charge control agent is negatively chargeable, the positively chargeable charge control agent is a salt comprising a compound containing a quaternary ammonium cation group and an anion and the negatively chargeable charge control agent is a salt comprising a complex anion comprising a salicylic acid derivative and a metal atom, and a cation.

3 Claims, 7 Drawing Sheets

U.S. PATENT DOCUMENTS

| | | | |
|---|---|---|---|
| 6,520,819 B1 * | 2/2003 | Sakaguchi | 445/24 |
| 6,822,782 B2 * | 11/2004 | Honeyman et al. | 359/296 |
| 6,828,955 B2 * | 12/2004 | Yamamoto et al. | 345/107 |
| 6,919,003 B2 * | 7/2005 | Ikeda et al. | 204/490 |
| 6,950,084 B2 * | 9/2005 | Yamamoto et al. | 345/88 |
| 7,224,511 B2 * | 5/2007 | Takagi | 359/296 |
| 7,236,291 B2 * | 6/2007 | Kaga et al. | 359/296 |
| 7,616,373 B2 * | 11/2009 | Soyama et al. | 359/296 |
| 7,646,530 B2 * | 1/2010 | Takagi et al. | 359/296 |
| 2006/0132896 A1 | 6/2006 | Hsu et al. | |

FOREIGN PATENT DOCUMENTS

| | | |
|---|---|---|
| CN | 1656418 A | 8/2005 |
| JP | 63-68848 A | 3/1988 |
| JP | 3-213874 A | 9/1991 |
| JP | 2004-341456 A | 12/2004 |
| JP | 2005-55783 A | 3/2005 |
| WO | 03/091799 A1 | 11/2003 |

* cited by examiner

FIG. 1
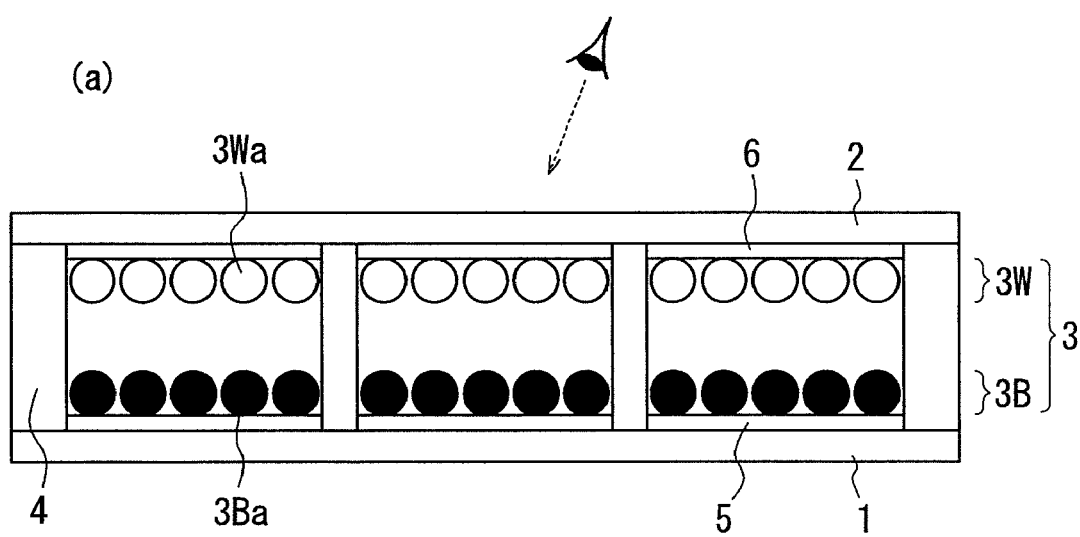
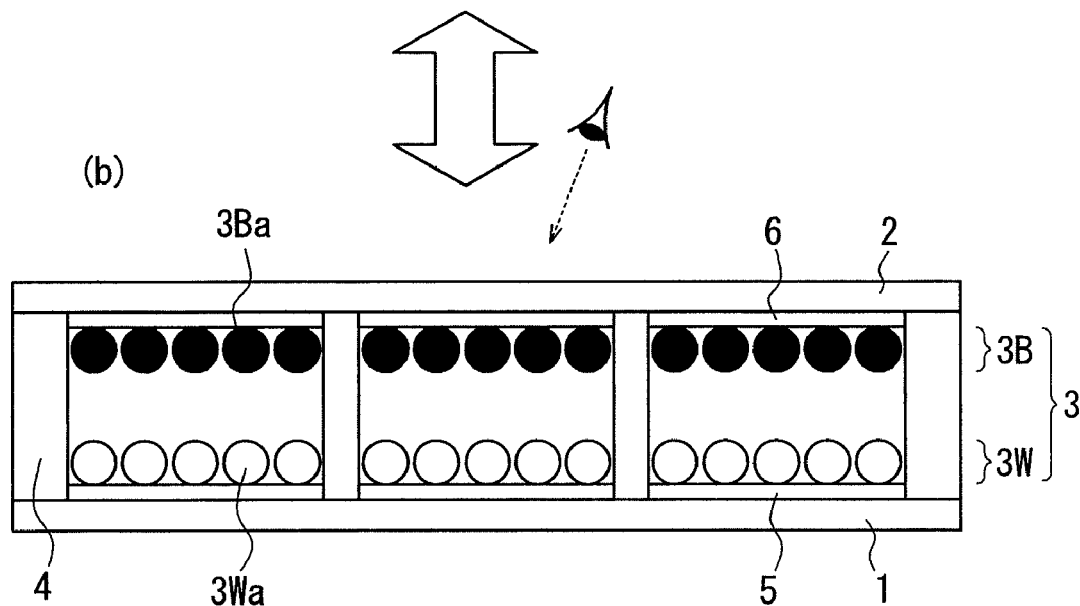

FIG. 3
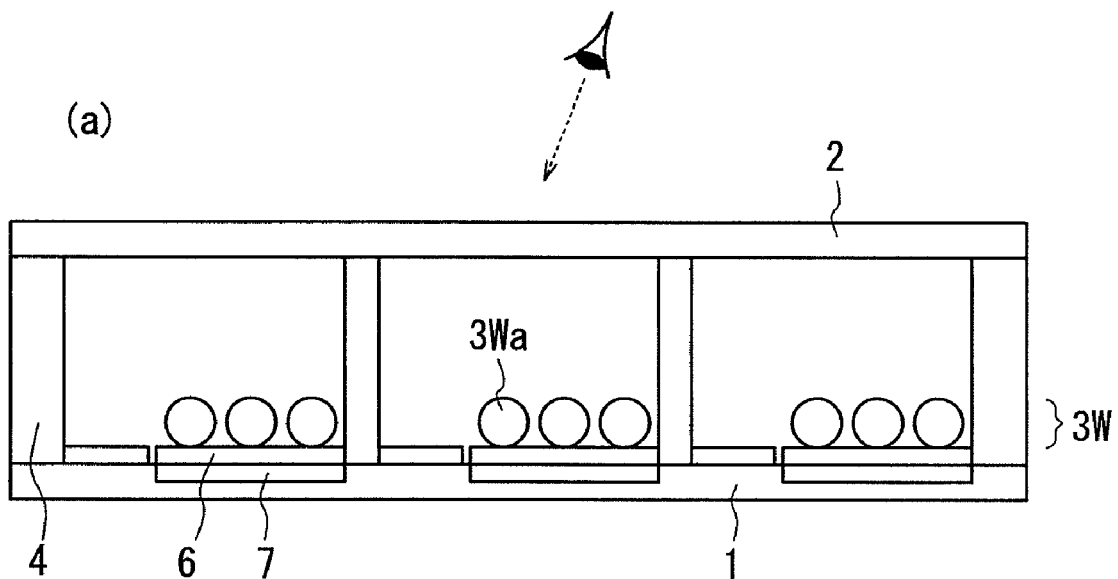
(a)
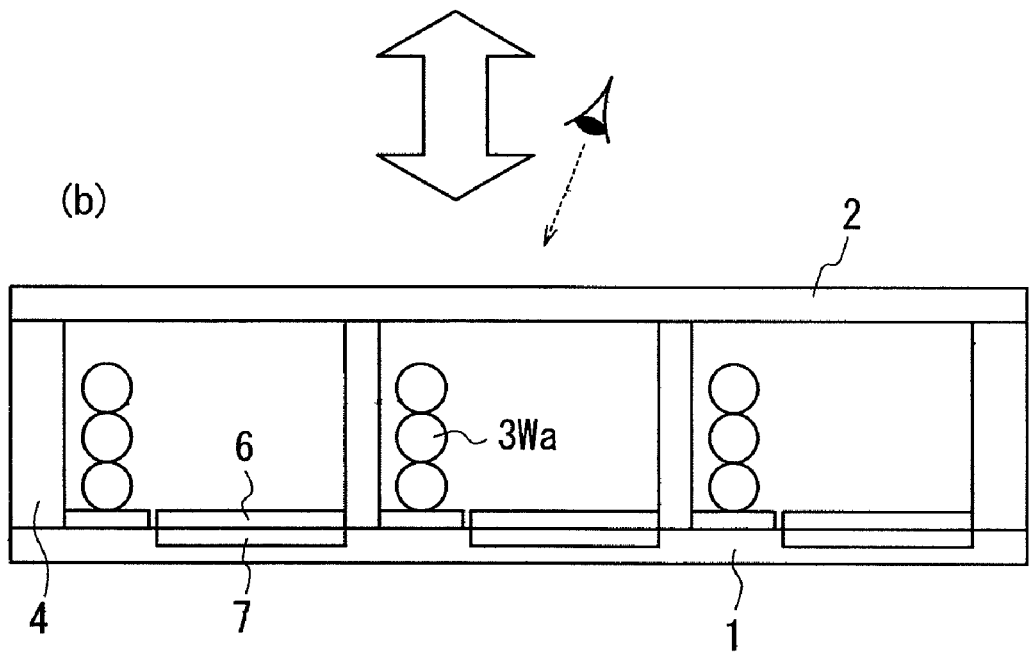
(b)

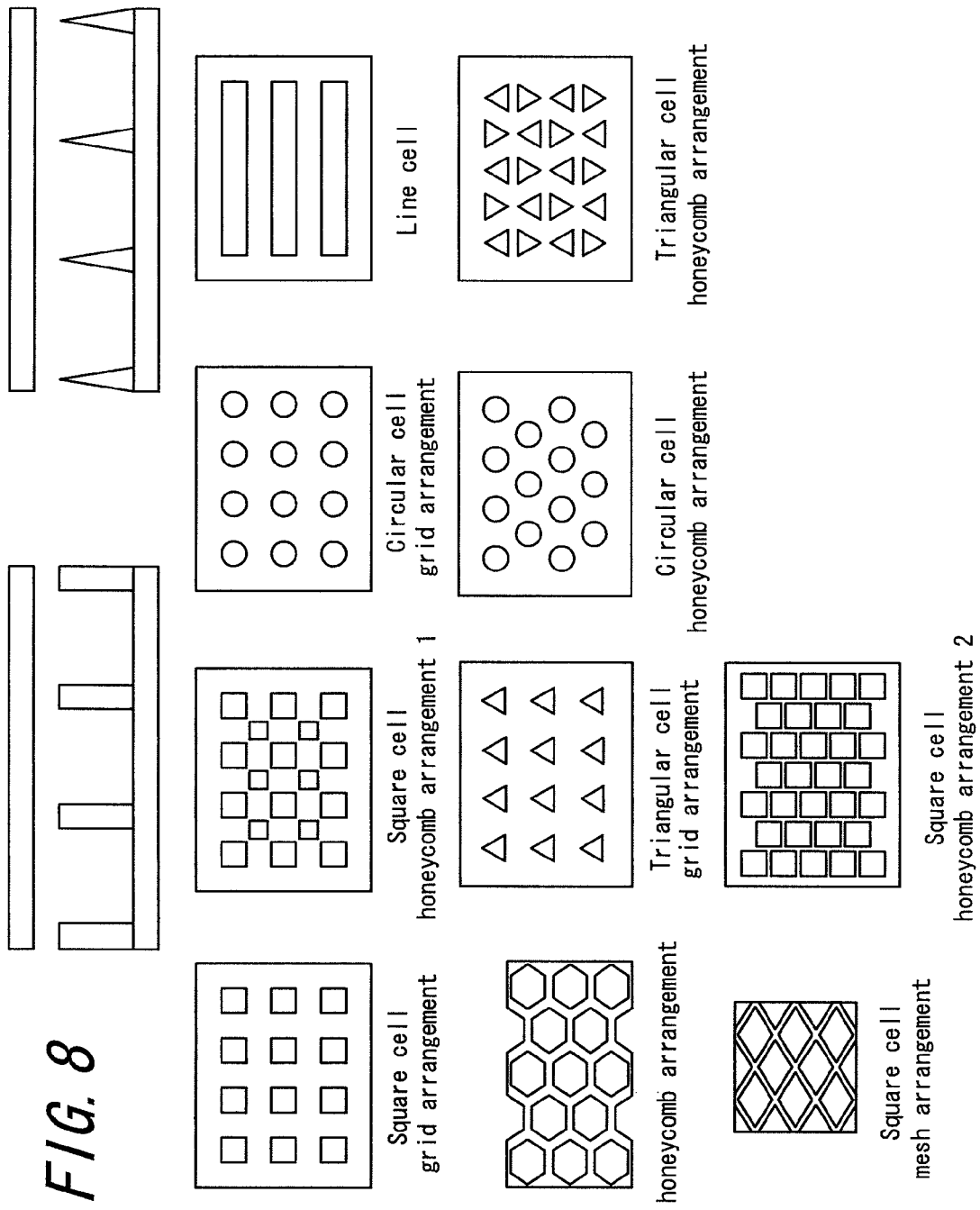

PARTICLES FOR DISPLAY MEDIA AND INFORMATION DISPLAY PANEL USING SAME

TECHNICAL FIELD

The present invention relates to particles for display media used for an information display panel, in which at least one kind of display media constituted as a group of particles including chargeable particles are sealed between two opposed substrates, at least one of two substrates being transparent, and in which the display media, to which an electrostatic field or an electric charge is applied, are made to move so as to display information, and also relates to an information display panel using same.

RELATED ART

Besides the electrophoresis method using behavior in solution, a method that electro-conductive particles and a charge transport layer are installed in a part of the substrate without using solution has been proposed. [The Imaging Society of Japan "Japan Hardcopy '99" (Jul. 21-23, 1999) Transaction Pages 249-252] However, the structure becomes complicated because the charge transport layer and further a charge generation layer are to be arranged. In addition, it is difficult to constantly charge the electro-conductive particles, and thus there is a drawback on the lack of stability.

As one method for overcoming the various problems mentioned above, an information display panel is known, in which display media constituted as a group of particles including chargeable particles are sealed between two opposed substrates, at least one of which is transparent, and in which the display media, to which an electrostatic field is applied, are made to move so as to display information.

DISCLOSURE OF THE INVENTION

In an information display panel, in which the above-mentioned display media constituted as a group of particles including chargeable particles are made to move by an electrostatic field to display information such as an image. As particles for display media, change in an amount of charge of such particles for display media by heating is not preferable. In an information display panel using such particles for display media having a problem in characteristics by heating, it is likely that display recovery (recovery by reversing) may take time or display failure may occur.

By the way, it is common to apply charge control agent (CCA) to control the charge of a toner for electronograph. Assuming that CCA is used for charge control of particles for display media used in the above-mentioned information display panel, since the particles for display media needs heat resistance, a resin having comparatively high glass transition temperature (Tg) is required as a base. However, CCA using a high Tg resin shows little control effect of an amount of charge. In other words, a charging rate of rise is small and initial display characteristics are inferior when an additive amount of CCA is small. On the other hand, a charging rate of rise is sufficient when an additive amount of CCA is large, however, there are problems that a saturated amount of charge becomes excessive and a voltage necessary for driving the panel rises to cause increase in power consumption and that high-voltage drive circuit elements are required to cause increase in cost of the whole display unit.

An object of the present invention is to eliminate the drawbacks mentioned above, to provide particles for display media capable of properly controlling change in an amount of charge by heating and to provide an information display panel by using the particles for display media capable of eliminating a display failure and reduction in contrast ratio.

The present invention relates to particles for display media used for an information display panel, in which at least one kind of display media constituted as a group of particles including chargeable particles are sealed between two opposed substrates, at least one of two substrates being transparent, and in which the display media, to which an electrostatic field and/or electric charge is applied, are made to move so as to display information, wherein two or more kinds of charge control agents (CCA) are contained in at least one kind of particles for display media.

According to the present invention, at least one kind of charge control agent is positively chargeable and at least one kind of charge control agent is negatively chargeable, the positively chargeable charge control agent is a salt comprising a compound containing a quaternary ammonium cation group and an anion and the negatively chargeable charge control agent is a salt comprising a complex anion comprising a salicylic acid derivative and a metal atom, and a cation.

In addition, the present invention also relates to an information display panel, in which at least one kind of display media constituted as a group of particles including chargeable particles are sealed between two opposed substrates, at least one of two substrates being transparent, and in which the display media, to which an electrostatic field is applied, are made to move so as to display information, wherein the above-mentioned particles for display media are used.

According to the present invention, since two or more kinds of charge control agents (CCA) are contained in at least one kind of particles for display media, at least one kind of charge control agent is positively chargeable and at least one kind of charge control agent is negatively chargeable, the positively chargeable charge control agent is a salt comprising a compound containing a quaternary ammonium cation group and an anion and the negatively chargeable charge control agent is a salt comprising a complex anion comprising a salicylic acid derivative and a metal atom, and a cation, it is possible to properly control change in an amount of charge by heating. Therefore, according to the information display panel using the particles for display media of the present invention, it is possible to obtain an information display panel, which is free from degradation in display contrast and response speed during repeatedly rewriting display and shows excellent durability in display characteristics.

BRIEF DESCRIPTION OF THE DRAWINGS

FIGS. 1a and 1b are schematic views respectively showing one example of the information display panel according to the invention.

FIGS. 3a and 3b are schematic views respectively depicting still another example of the information display panel according to the invention.

FIG. 8 is a schematic view showing one example of a shape of the partition walls in the information display panel according to the invention.

BEST MODE FOR CARRYING OUT THE INVENTION

Figure 2:
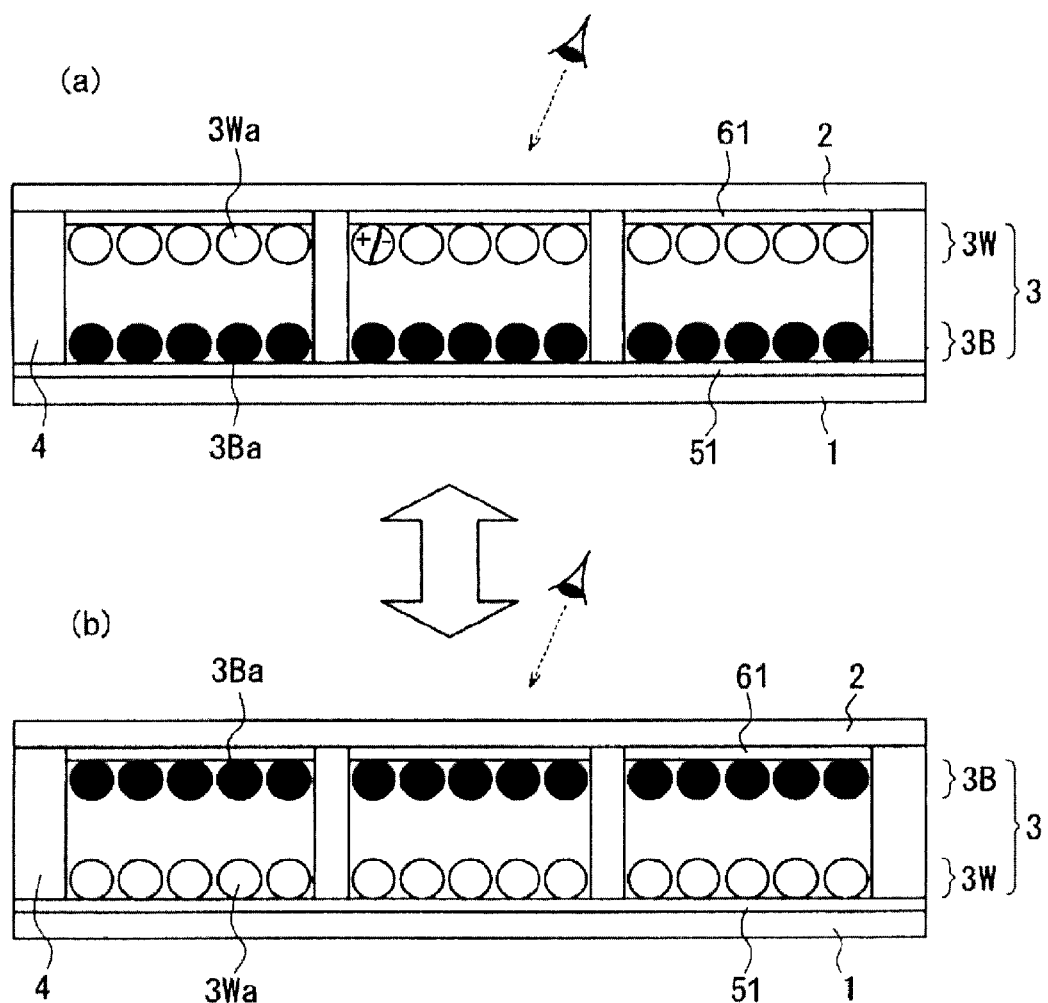
FIGS. 2a and 2b are schematic views respectively illustrating another example of the information display panel according to the invention.
Figure 4:
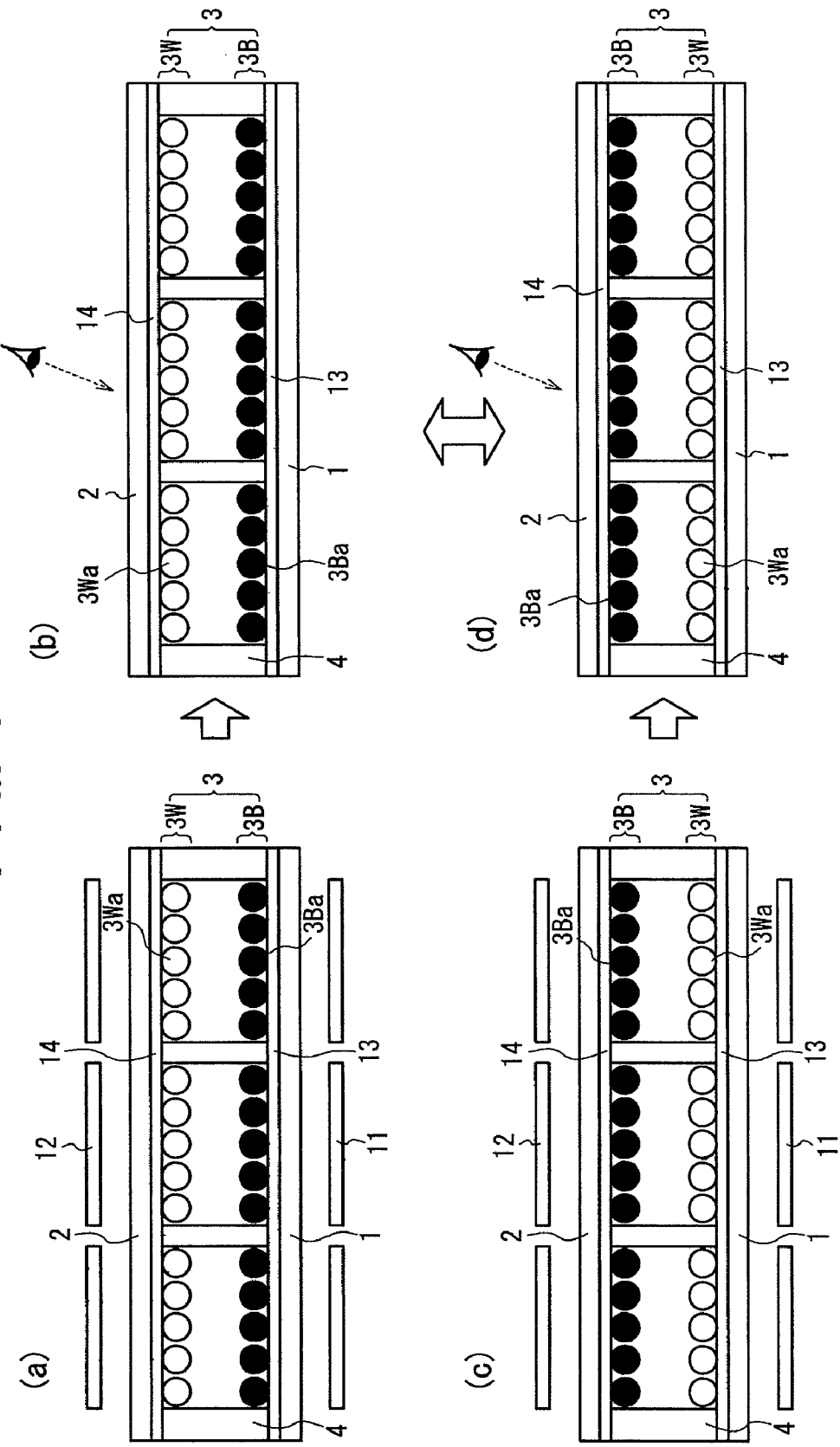
FIGS. 4a to 4d are schematic views respectively depicting still another example of the information display panel according to the invention.
Figure 5:
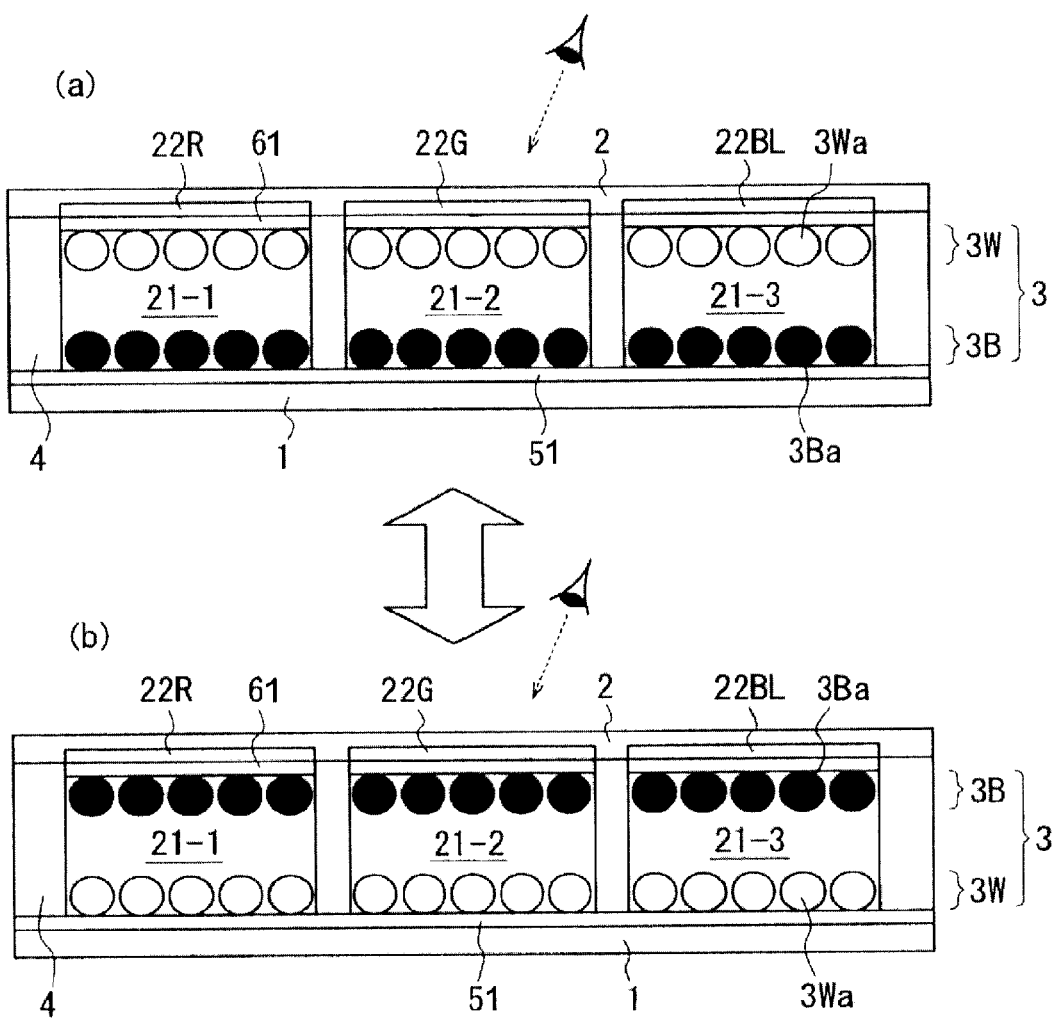
FIGS. 5a and 5b are schematic views respectively depicting still another example of the information display panel according to the invention.

At first, a basic construction of an information display panel according to the present invention will be explained. In the information display panel according to the present invention, an electrostatic field is applied to display media constituted as a group of particles including chargeable particles sealed between two opposed substrates. Along a direction of the applied electrostatic field by means of the force of the electrostatic field, Coulomb's force or the like, the display media are attracted and moved by varying a direction of electrostatic field. Accordingly, information such as an image or the like can be displayed. Therefore, it is necessary to design the information display panel in such a manner that the display media can move evenly and maintain stability during repeatedly rewriting display or during continuously displaying information. Here, as to forces applied to the particles constituting display media, there are an attraction force between the particles due to Coulomb's force, an imaging force with respect to the electrodes or substrates, an intermolecular force, a liquid bonding force, a gravity and the like.

Examples of the information display panel according to the present invention will be explained with reference to FIGS. 1a and 1b to FIG. 7.

In the examples shown in FIGS. 1a and 1b, at least two or more groups of display media having different optical reflectance and different charge characteristics and consisting of at least one or more groups of particles (here, white color display media 3W made of the particles for white color display media 3Wa and black color display media 3B made of the particles for black color display media 3Ba are shown) are sealed between substrates. In each cell formed by partition walls 4, according to an electrostatic field generated by voltage applied between an electrode 5 (individual electrode) provided with the substrate 1 and an electrode 6 (individual electrode) provided with the substrate 2, the particles are made to move in a perpendicular direction with respect to substrates 1 and 2. As a result, a white color is displayed by viewing the white color display media 3W to the observer as shown in FIG. 1a or a black color is displayed by viewing the black color display media 3B to an observer as shown in FIG. 1b. Moreover, in FIGS. 1a and 1b, the partition walls arranged at the near side are omitted.

In the examples shown in FIGS. 2a and 2b, at least two or more groups of display media having different optical reflectance and different charge characteristics and consisting of at least one or more groups of particles (here, white color display media 3W made of the particles for white color display media 3Wa and black color display media 3B made of the particles for black color display media 3Ba are shown) are sealed between substrates. In each cell formed by partition walls 4, according to an electrostatic field generated by voltage applied between an electrode 51 (line electrode) provided with the substrate 1 and an electrode 61 (line electrode) provided with the substrate 2, the particles are made to move in a perpendicular direction with respect to substrates 1 and 2. As a result, a white color is displayed by viewing the white color display media 3W to the observer as shown in FIG. 2a or a black color is displayed by viewing the black color display media 3B to an observer as shown in FIG. 2b. Moreover, in FIGS. 2a and 2b, the partition walls arranged at the near side are omitted.

In the examples shown in FIGS. 3a and 3b, one kind of display media having optical reflectance and charge characteristics and consisting of at least one or more groups of particles (here, white color display media 3W made of the particles for white color display media 3Wa are shown) are sealed between substrates. In each cell formed by partition walls 4, according to an electrostatic field generated by voltage applied between electrodes 5 and 6 provided with the substrate 1, the particles are made to move in a parallel direction with respect to substrate 1. As a result, a white color is displayed by viewing the white color display media 3W to the observer as shown in FIG. 3a or a black color is displayed by viewing a black plate 7 to an observer as shown in FIG. 3b. Moreover, in FIGS. 3a and 3b, the partition walls arranged at the near side are omitted.

In the examples shown in FIGS. 4a to 4d, firstly as shown in FIGS. 4a and 4c, at least two or more groups of display media having different optical reflectance and different charge characteristics and consisting of at least one or more groups of particles (here, white color display media 3W made of the particles for white color display media 3Wa and black color display media 3B made of the particles for black color display media 3Ba are shown) are sealed between substrates. In each cell formed by partition walls 4, according to an electrostatic field generated by voltage applied between an outside electrostatic field forming means 11 provided in the outside of the substrate 1 and an outside electrostatic field forming means 12 provided in the outside of the substrate 2, the particles are made to move in a perpendicular direction with respect to substrates 1 and 2. As a result, a white color is displayed by viewing the white color display media 3W to the observer as shown in FIG. 4b or a black color is displayed by viewing the black color display media 3B to an observer as shown in FIG. 4d. Moreover, in FIGS. 4a to 4d, the partition walls arranged at the near side are omitted. A conductive member 13 is provided in the inside of the substrate 1 and a conductive member 14 is provided in the inside of the substrate 2. These conductive members may not be provided.

In the examples shown in FIGS. 5a and 5b, an example of a color display, in which a display unit (one dot) is constituted by three cells. In the examples shown in FIGS. 5a and 5b, white color display media 3W and black color display media 3B as display media are filled into all cells 21-1 to 21-3. A red color filter 22R is provided in the observation side of a first cell 21-1, a green color filter 22G is provided in the observation side of a second cell 21-2 and a blue color filter 22BL is provided in the observation side of a third cell 21-3 to form a display unit with three cells of the first cell 21-1, the second cell 21-2 and the third cell 21-3. In this example, a white color dot is displayed to an observer as shown in FIG. 5a by moving the white display media 3W to the observation side in all of the first cell 21-1, the second cell 21-2 and the third cell 21-3 or a black color dot is displayed to an observer as shown in FIG. 5b by moving the black display media 3B to the observation side in all of the first cell 21-1, the second cell 21-2 and the third cell 21-3. Moreover, in FIGS. 5a and 5b, the partition walls arranged at the near side are omitted. In each cell, multiple colors can be displayed according to a way of moving the display media.

Figure 6:
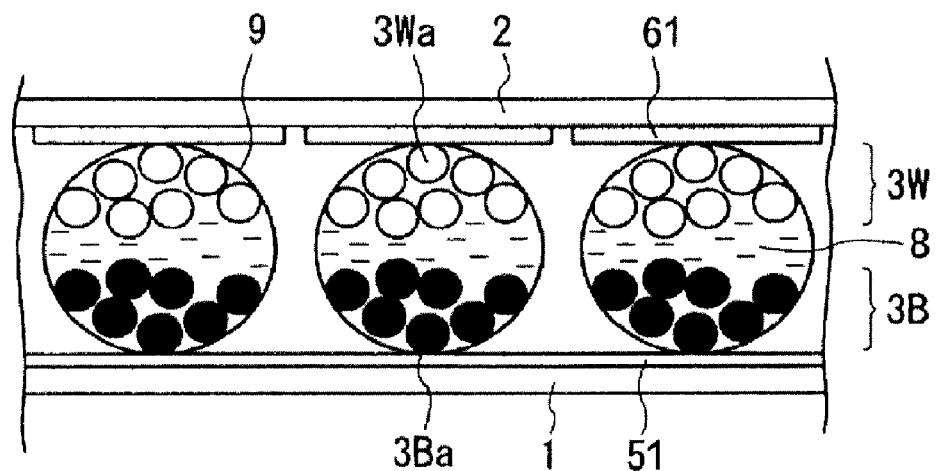
FIG. 6 is a schematic view depicting still another example of the information display panel according to the invention.
Figure 7:
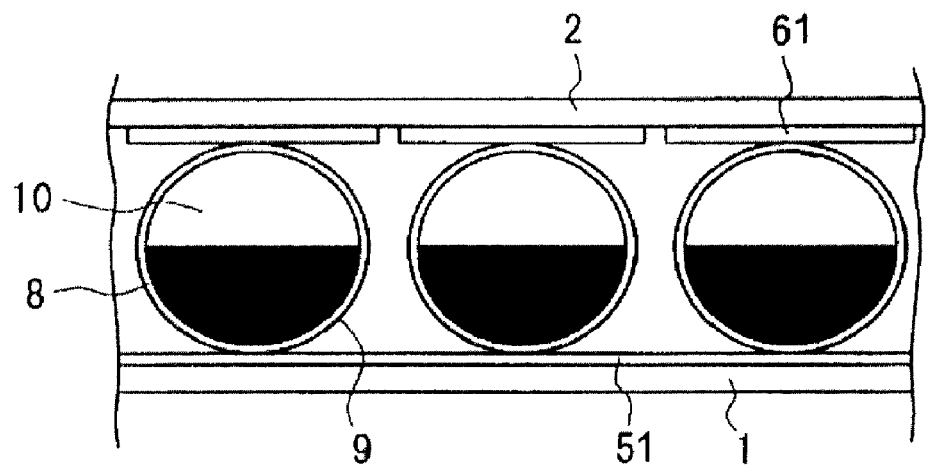
FIG. 7 is a schematic view depicting still another example of the information display panel according to the invention.

In FIGS. 6 and 7, another example to display white and black by using line electrode 51, 61 as similar to the examples FIGS. 2a and 2b will be explained. In the example shown in FIG. 6, a microcapsule 9 filled with white display media 3W, black display media 3B and transparent insulating liquid 8 is used instead of a cell filled with white display media 3W and black display media 3B and formed by partition walls shown in FIGS. 2a and 2b. In the example shown in FIG. 7, a microcapsule 9 filled with transparent insulating liquid 8 and a rotating ball 10, which is painted white and black with reverse polarity in halves as display media, is used instead of a cell filled with white display media 3W and black display media 3B and formed by partition walls shown in FIGS. 2a and 2b. In both examples shown in FIGS. 6 and 7, as similar to the example shown in FIG. 2b, white and black dot display can be achieved.

According to the present invention, two or more kinds of charge control agents (CCA) are contained in at least one kind of particles for display media, at least one kind of CCA is positively chargeable, at least one kind of CCA is negatively chargeable, the positively chargeable CCA is a salt comprising a compound containing a quaternary ammonium cation group and an anion, and the negatively chargeable CCA is a salt comprising a complex anion comprising a salicylic acid derivative and a metal atom, and a cation.

It is noted that charging polarity of CCA is judged in such a manner that after CCA having 5 w/t parts is blended with general-purpose polystyrene (G320C: produced by TOYO STYRENE Co., Ltd) having 100 w/t parts as a normal standard base resin, kneaded, triturated and classified to obtain particles having D=10 μm (D is an average particle diameter) and then thus-obtained particles are mixed with reference materials (ferrite carrier: Powdertech F96-80). In this condition, an amount of charge C is judged as follows.

When C>+0.1 [μC/g], CCA is positively chargeable.
When C<−0.1 [μC/g], CCA is negatively chargeable.

The particles for display media should be made of a resin having comparatively high glass transition temperature (Tg) as a base since the particles for display media needs heat resistance. However, CCA using a high Tg resin shows little control effect of an amount of charge. In other words, a charging rate of rise is small and initial display characteristics are inferior when an additive amount of CCA is small. On the other hand, a charging rate of rise is sufficient when an additive amount of CCA is large. However, there are problems that a saturated amount of charge becomes excessive and a voltage necessary for driving a panel rises to cause increase in power consumption and that high-voltage drive circuit elements are required, which will cause increase in cost of the whole display unit.

Therefore, the present inventors have studied to find that the above-mentioned problems can be solved by using two kinds of CCA. That is, the inventors have found out that a charging rate of rise depends on a total additive amount of CCA and a saturated amount of charge is an average value of that of two kinds of CCA.

Thus, it is possible to constitute particles for display media capable of obtaining sufficient charging rate of rise and having a saturated amount of charge, being not excessive, even by using a resin having high Tg as a base.

For example, when one of two kinds of CCA is negatively charged and the other CCA is positively charged, it is possible to constitute high-performance particles for display media by using this effect advantageously.

Hereinafter, respective members constituting the information display panel according to the invention will be explained.

As for the substrate, at least one of the substrates is the transparent substrate 2 through which a color of the display media can be observed from outside of the information display panel, and it is preferred to use a material having a high transmission factor of visible light and an excellent heat resistance. The other substrate 1 may be transparent or may be opaque. Examples of the substrate material include polymer sheets such as polyethylene terephthalate, polyethylene naphthalate, polyether sulfone, polyethylene, polycarbonate, polyimide or acryl and metal sheets having flexibility and inorganic sheets such as glass, quartz or such having no flexibility. The thickness of the substrate is preferably 2 μm to 5000 μm, more preferably 5 μm to 2000 μm. When the thickness is too thin, it becomes difficult to maintain strength and distance uniformity between the substrates. On the other hand, when the thickness is thicker than 5000 mm, there is a drawback as a thin-type information display panel.

As material of the electrode in case of arranging the electrode in the information display panel if needed, use is made of metals such as aluminum, silver, nickel, copper, gold, or, conductive metal oxides such as indium tin oxide (ITO), indium oxide, antimony tin oxide (ATO), aluminum doped zinc oxide (AZO), conductive tin oxide, conductive zinc oxide and so on, or, conductive polymers such as polyaniline, polypyrrole, polythiophene and so on, and they are used by being suitably selected. As an electrode forming method, use is made of a method in which the materials mentioned above are made to a thin film by means of sputtering method, vacuum vapor deposition method, CVD (chemical vapor deposition) method, coating method and so on, a method of laminating a metal foil (for example, rolled copper foil) or a method in which conductive materials and solvents are mixed with synthetic resin binder and the mixture is sprayed to perform patterning. A transparency is necessary for the electrode arranged to the substrate 2, which has to be transparent and is disposed at an observation side, but it is not necessary for the electrode arranged to the substrate 1 at a rear side. In both cases, the materials mentioned above, which have a pattern formation capability and are electro-conductive, can be preferably used. Additionally, the thickness of the electrode may be suitable unless the electro-conductivity is absent or any hindrance exists in optical transparency, and it is preferable to be 0.01 μm to 10 μm, more preferable to be 0.05 μm to 5 μm. The material and the thickness of the electrode arranged to the rear substrate 1 are the same as those of the electrode arranged to the substrate at the display side, but transparency is not necessary. In this case, the applied outer voltage may be superimposed with a direct current or an alternate current.

As for the partition wall 4 arranged to the substrate if needed, a shape of the partition wall is suitably designed in accordance with a kind of the display media used for the display and a shape or an arrangement of the electrode to be provided and is not restricted. However, it is preferred to set a width of the partition wall to 2 μm to 100 μm, more preferably 3 μm to 50 μm and to set a height of the partition wall to 10 μm-100 μm, more preferably 10 μm-50 μm.

Moreover, as a method of forming the partition wall, there are a double rib method, in which ribs are formed on the opposed substrates 1, 2 respectively and then connected with each other and single rib method, in which ribs are formed on one of the opposed substrates only. Both of the above-mentioned methods may be preferably applied to the present invention.

The cell formed by the partition walls made of these ribs has a square shape, a triangular shape, a line shape, a circular shape and a hexagon shape, and has an arrangement such as a grid, a honeycomb and a mesh, as shown in FIG. 8 as viewed from a plane surface of the substrate. It is preferred that the portion (an area of the frame portion of the cell) corresponding to a cross section of the partition wall observed from the display side should be made as small as possible. In this case, a clearness of the image display can be improved.

As the formation method of the partition wall there are a die transferring method, a screen-printing method, a sandblast method, a photolithography method and an additive method. Among them, it is preferred to use a photolithography method using a resist film and a die transferring method.

Hereinafter, the particles for display media (hereinafter, sometimes called as particles) will be explained. Only the particles for display media are made to be display media or the particles for display media together with other particles are made to be display media.

The particle may be composed of resins as a main ingredient, and can include if needed charge control agents, coloring agents, inorganic additives and so on as is the same as the known one. Hereinafter, typical examples of resins, charge control agents, coloring agents, other additives will be explained.

Typical examples of resins include urethane resin, urea resin, acrylic resin, polyester resin, acryl urethane resin, acryl urethane silicone resin, acryl urethane fluorocarbon polymers, acryl fluorocarbon polymers, silicone resin, acryl silicone resin, epoxy resin, polystyrene resin, styrene acrylic resin, polyolefin resin, butyral resin, vinylidene chloride resin, melamine resin, phenolic resin, fluorocarbon resin, polycarbonate resin, polysulfone resin, polyether resin, and polyamide resin. Two kinds or more of these may be mixed and used. For the purpose of controlling the attaching force to the substrate, acryl urethane resin, acryl silicone resin, acryl fluorocarbon resin, acryl urethane silicone resin, acryl urethane fluorocarbon resin, fluorocarbon resin, silicone resin are particularly preferable.

Examples of the charge control agents (CCA) include, but not particularly specified to, negatively chargeable control agent such as salicylic acid metal complex, metal containing azo dye, oil-soluble dye of metal-containing (containing a metal ion or a metal atom), quaternary ammonium salt compound, calixarene compound, boron-containing compound (benzyl acid boron complex), and nitroimidazole derivative. Examples of the positively chargeable control agent include nigrosine dye, triphenylmethane compound, quaternary ammonium salt compound, polyamine resin, imidazole derivatives. Additionally, metal oxides such as ultra-fine particles of silica, ultra-fine particles of titanium oxide, ultra-fine particles of alumina, and so on, nitrogen-containing circular compound such as pyridine and so on, and these derivates or salts, and resins containing various organic pigments, fluorine, chlorine, nitrogen and so on can be employed as the charge control agent.

As for a coloring agent, various kinds and colors of organic or inorganic pigments or dye as will be described below are employable.

Examples of black pigments include carbon black, copper oxide, manganese dioxide, aniline black, and activate carbon.

Examples of blue pigments include C.I. pigment blue 15:3, C.I. pigment blue 15, Berlin blue, cobalt blue, alkali blue lake, Victoria blue lake, phthalocyanine blue, metal-free phthalocyanine blue, partially chlorinated phthalocyanine blue, first sky blue, and Indanthrene blue BC.

Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, and C.I. pigment red 2.

Examples of yellow pigments include chrome yellow, zinc chromate, cadmium yellow, yellow iron oxide, mineral first yellow, nickel titanium yellow, navel orange yellow, naphthol yellow S, hanzayellow G, hanzayellow 10G, benzidine yellow G, benzidine yellow GR, quinoline yellow lake, permanent yellow NCG, tartrazinelake, and C.I. pigment yellow 12.

Examples of green pigments include chrome green, chromium oxide, pigment green B, C.I. pigment green 7, Malachite green lake, and final yellow green G.

Examples of orange pigments include red chrome yellow, molybdenum orange, permanent orange GTR, pyrazolone orange, Balkan orange, Indanthrene brilliant orange RK, benzidine orange G, Indanthrene brilliant orange GK, and C.I. pigment orange 31.

Examples of purple pigments include manganese purple, first violet B, and methyl violet lake.

Examples of white pigments include zinc white, titanium oxide, antimony white, and zinc sulphide.

Examples of extenders include baryta powder, barium carbonate, clay, silica, white carbon, talc, and alumina white. Furthermore, there are Nigrosine, Methylene Blue, rose bengal, quinoline yellow, and ultramarine blue as various dyes such as basic dye, acidic dye, dispersion dye, direct dye, etc.

Examples of inorganic additives include titanium oxide, zinc white, zinc sulphide, antimony oxide, calcium carbonate, pearl white, talc, silica, calcium silicate, alumina white, cadmium yellow, cadmium red, titanium yellow, Pressian blue, Armenian blue, cobalt blue, cobalt green, cobalt violet, ion oxide, carbon black, manganese ferrite black, cobalt ferrite black, copper powder, aluminum powder.

These coloring agents and inorganic additives may be used alone or in combination of two or more kinds thereof. Particularly, carbon black is preferable as the black coloring agent, and titanium oxide is preferable as the white coloring agent. By mixing the coloring agents mentioned above, it is possible to produce a particle for display media having a suitable color.

Moreover, as the particle diameter of the particles for display media (sometimes called as particles), it is preferred to set an average particle diameter $d(0.5)$ to 1 µm to 20 µm and to use even particles. If the average particle diameter $d(0.5)$ exceeds this range, the image clearness sometimes deteriorated. On the other hand, if the particle diameter is smaller than this range, an agglutination force between the particles becomes too large and the movement of the particles is prevented.

Further, it is preferred that particle diameter distribution Span of the particles for display media, which is defined by the following formula, is less 5 preferably less than 3:

$$\text{Span}=(d(0.9)-d(0.1))/d(0.5);$$

(here, $d(0.5)$ means a value of the particle diameter expressed by mm wherein an amount of the particles having the particle diameter larger than or smaller than this value is 50%, $d(0.1)$ means a value of the particle diameter expressed by mm wherein an amount of the particles having the particle diameter smaller than this value is 10%, and $d(0.9)$ means a value of the particle diameter expressed by mm wherein an amount of the particles having the particle diameter smaller than this value is 90%).

If the particle diameter distribution Span is set to not more than 5, the particle diameter becomes even and it is possible to perform an even particle movement.

Furthermore, as a correlation between the particles for display media, it is preferred to set a ratio of $d(0.5)$ of the particles having smallest diameter with respect to $d(0.5)$ of the particles having largest diameter to not more than 50 preferably not more than 10. The particles having different charge characteristics with each other are moved reversely, even if the particle diameter distribution Span is made smaller. Therefore, it is preferred that the particle sizes of the particles are made to be even with each other, and same amounts of the particles are easily moved in a reverse direction, and thus that is this range.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution.

In the present invention, it is defined that the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

A charge amount of the display media properly depends upon the measuring condition. However, it is understood that the charge amount of the display media used for the display media in the information display panel substantially depends upon an initial charge amount, a contact with respect to the partition wall, a contact with respect to the substrate, a charge decay due to an elapsed time, and specifically a saturation value of the particles for the display media during a charge behavior is a main factor.

After various investigations of the inventors, it is fond that an adequate range of the charged values of the particles for the display media can be estimated by performing a blow-off method utilizing the same carrier particles so as to measure the charge amount of the particles for the display media.

Further, in the information display panel in which the display media constituted by the particles for display media are driven in an air space, it is important to control a gas in a gap surrounding the display media between the substrates, and a suitable gas control contributes an improvement of display stability. Specifically, it is important to control a humidity of the gap gas to not more than 60% RH at 25 degree C., preferably not more than 50% RH.

The above gap means a gas portion surrounding the display media obtained by substituting the electrodes 5, 6 (in the case of arranging electrode inside of substrate), an occupied portion of the display media 3, an occupied portion of the partition walls 4 and a seal portion of the device from the space between the substrate 1 and the substrate 2 for example in FIGS. 1a and 1b to FIGS. 5a and 5b.

A kind of the gap gas is not limited if it has the humidity mentioned above, but it is preferred to use dry air, dry nitrogen gas, dry argon gas, dry helium gas, dry carbon dioxide gas, dry methane gas and so on. It is necessary to seal this gas in the information display panel so as to maintain the humidity mentioned above. For example, it is important to perform the operations of filling the display media and assembling the substrate under an atmosphere having a predetermined humidity and to apply a seal member and a seal method for preventing a humidity inclusion from outside of the device.

In the information display panel according to the invention, an interval between the substrates is not restricted if the display media can be moved and a contrast can be maintained, and it is adjusted normally to 10 μm to 500 μm, preferably 10 μm to 200 μm. In the information display panel, in which display media are driven by an electrostatic field in the gas, an interval between the substrates is preferably 10 μm to 100 μm, more preferably 10 μm to 50 μm.

Moreover, it is preferred to control a volume occupied rate of the display media in a gas space between the opposed substrates to 5% to 70%, more preferably 5% to 60%. If the volume occupied rate of the display media exceeds 70%, the display media become difficult to move, and if it is less than 5%, a sufficient contrast cannot be obtained and a clear image display is not performed.

EXAMPLE

Hereinafter, the present invention will be described specifically with reference to Examples and Comparative Examples. However, it is noted that the present invention is not limited to Examples.

(1) Preparation of Particles by Kneading, Triturating and Classifying Methods (Particle 1 to Particle 8):

Positively chargeable particles 1, 2 and 8 and negatively chargeable particles 3 to 7 are prepared by using kneading, triturating and classifying methods. Hereinafter, particles 3 will be explained, for example.

As negatively chargeable particles 100 w/t parts of cycloolefin resin (ZEONEX(R) 330R: produced by ZEON CORPORATION) and 100 w/t parts of titanium dioxide (TIPAQUE(R) CR-90: produced by ISHIHARA SANGYO KAISHA, LTD.), as negatively chargeable charge control agent 7 w/t parts of salicylic acid metal complex compound (BONTRON(R) E-84: produced by Orient Chemical Industries, Ltd.), and as positively chargeable charge control agent 1 w/t part of quaternary ammonium chloride (BONTRON(R) P-51: produced by Orient Chemical Industries, Ltd.) are prepared. Thus-prepared materials are melt-kneaded by two axis kneaders, finely triturated in a jet mil (laboratory jet mil IDS-LJ type: produced by Nippon Pneumatic Mfg. Co., Ltd.), and classified by a classifier (MDS-2: Nippon Pneumatic Mfg. Co., Ltd.) to obtain particles 3 having a particle diameter of 0.5 μm to 50 μm and an average particle diameter of R0=9.9 μm.

Other than particles 3, positively chargeable particles 1, 2 and 8 and negatively chargeable particles 4 to 7 are similarly kneaded, triturated and classified to obtain particles having an average particle diameter as shown in Table 1 by using a base resin, a coloring agent, a charge control agent as shown in Table 1.

TABLE 1

|  | Particle 1 | Particle 2 | Particle 3 | Particle 4 | Particle 5 | Particle 6 | Particle 7 | Particle 8 |
| --- | --- | --- | --- | --- | --- | --- | --- | --- |
| Polarity | Positive | Positive | Negative | Negative | Negative | Negative | Negative | Positive |
| Forming Method | | | Kneading, Triturating and Classifying Method | | | | | |
| Base Resin | Polymethacrylate resin | Polymethacrylate resin | Cycloolefin resin | Polystyrene resin | Polystyrene resin | Polystyrene resin | Cycloolefin resin | Ethylene-Methacrylic acid resin |
|  | 100 w/t parts | 100 w/t parts | 100 w/t parts | 100 w/t parts | 100 w/t parts | 100 w/t parts | 100 w/t parts | 100 w/t parts |
| Glass Transition Temp. Tg [° C.] | 129 | 129 | 123 | 121 | 121 | 121 | 123 | 70 |
| Coloring Agent | Carbon black | Carbon black | Titanium dioxide | Titanium dioxide | Titanium dioxide | Titanium dioxide | Titanium dioxide | Carbon black |
|  | 5 w/t parts | 5 w/t parts | 100 w/t parts | 100 w/t parts | 100 w/t parts | 100 w/t parts | 100 w/t parts | 5 w/t parts |

TABLE 1-continued

| | Particle 1 | Particle 2 | Particle 3 | Particle 4 | Particle 5 | Particle 6 | Particle 7 | Particle 8 |
|---|---|---|---|---|---|---|---|---|
| Positively Chargeable CCA | Nigrosin compound 3 w/t parts | Quaternary ammonium salt compound 7 w/t parts | Quaternary ammonium salt compound 1 w/t part | Quaternary ammonium salt compound 1 w/t part | | | | |
| Negatively Chargeable CCA 1 | | Salicylic acid metal complex 1 1 w/t part | Salicylic acid metal complex 2 7 w/t parts | Salicylic acid metal complex 1 3 w/t parts | Salicylic acid metal complex 1 3 w/t parts | | Salicylic acid metal complex 2 2 w/t parts | Salicylic acid metal complex 1 1 w/t part |
| Negatively Chargeable CCA 2 | | | | | | | Calixarene compound 2 w/t parts | |
| Average Particle Diameter [μm] | 9.1 | 9.2 | 9.9 | 9.8 | 9.0 | 9.6 | 9.9 | 9.1 |

(2) Polarity Evaluation (Judgment) of Charge Control Agent:

Charge control agent having 5 w/t parts and general-purpose polystyrene resin (G320C: produced by TOYO STYRENE Co., Ltd) are kneaded, triturated and classified similarly to the above-mentioned embodiment to produce fine particles having an average particle diameter of 9 μm-10 μm. Thus-produced fine particle having 3 w/t parts and a reference material (ferrite carrier: F96-80: produced by Powdertech Co., Ltd.) having 97 w/t parts are blended to measure an amount of charge.

In this embodiment, a blowoff method type charge amount measuring device TB-203 (produced by KYOCERA Chemical Corporation) is used as a charge amount measuring device and a shaking apparatus YD-8 (produced by Yayoi Co., Ltd.) is used as a charging device for 100 rpm×10 minutes. The results are shown in Table 2.

Salicylic acid metal complex 2: BONTRON(R) E-84 (produced by Orient Chemical Industries, Ltd.)
Calixarene compound: BONTRON(R) E-89 (produced by Orient Chemical Industries, Ltd.)

(3) Particles Combination of Examples and Comparative Examples and a Driving Examination:

The same weight of positively chargeable particles X and negatively chargeable particles Y are blended and agitated to be frictionally charged. Thus-charged particles are sealed into cells formed by two substrate disposed via a spacer having 100 μm thickness, one being a glass substrate whose inside is applied with ITO and which is connected to a power supply and the other being a copper substrate, together with dry air of relative humidity 55% RH at volume share 30% to obtain an information display panel for evaluation.

At room temperature (23 degrees C.), a power supply is respectively connected to the ITO glass substrate and the

TABLE 2

| | Sample. 1 | Sample. 2 | Sample. 3 | Sample. 4 | Sample. 5 |
|---|---|---|---|---|---|
| Base Resin | General-purpose polystyrene | General-purpose polystyrene | General-purpose polystyrene | General-purpose polystyrene | General-purpose polystyrene |
| CCA | Nigrosin compound | Quaternary ammonium salt compound | Salicylic acid metal complex 2 | Salicylic acid metal complex 1 | Calixarene compound |
| Amount of Charge [μC/g] | +41.0 | +19.4 | −32.7 | −24.8 | −16.6 |
| Judgment | Positive | Positive | Negative | Negative | Negative |

The base resins, the coloring agents, product names of charge control agents in Tables 1 and 2 are as follows.
Polymethacrylate resin: Terupet(R) 80N (produced by Asahi Kasei Chemicals Corporation)
Cycloolefin resin: ZEONEX(R) 330R (produced by ZEON CORPORATION)
Polystyrene resin: Toyostyrol(R) 320C (produced by TOYO STYRENE Co., Ltd)
Ethylene-methacrylic acid resin: NUCREL(R) N0200H (produced by Du Pont)
General-purpose polystyrene: G15L (produced by Toyo Styrol)
Carbon black: MA100 (produced by Mitsubishi Chemical Corporation)
Titanium dioxide: TIPAQUE(R) CR-90 (produced by ISHIHARA SANGYO KAISHA, LTD.)
Nigrosin compound: BONTRON(R) N-07 (produced by Orient Chemical Industries, Ltd.)
Quaternary ammonium salt compound: BONTRON(R) P-51 (produced by Orient Chemical Industries, Ltd.)
Salicylic acid metal complex 1: BONTRON(R) E-88 (produced by Orient Chemical Industries, Ltd.)

copper substrate. When DC voltage is applied in such a manner that the ITO glass substrate is low potential and the copper substrate is high potential, the positively chargeable particles X are moved to the low potential side and negatively chargeable particles Y are moved to the high potential side. If the positively chargeable particles X are black and negatively chargeable particles Y are white, black display state is observed through the glass substrate. Next, when the potential of applied voltage is reversed, particles are moved in reverse respectively, and white display state is observed. With the applied voltage of ±200V, reflectivity is measured in each display state. The ratio of reflectivity in white display and reflectivity in black display is assumed display characteristics at room temperature (23 degrees C.) and the results are shown in Table 3.

In addition, similar measurement is performed at high temperature (50 degrees C.). The ratio of reflectivity in white display and reflectivity in black display is assumed display characteristics at high temperature (50 degrees C.) and the results are shown in Table 3.

In Table 3, a judgment is described as good (pass) when a display characteristic is not less than 5.0, while the judgment is described as bad (fail) when a display characteristic is less than 5.0.

TABLE 3

|  | Example 1 | Example 2 | Example 3 | Example 4 | Example 5 | Example 6 | Example 7 | Comparative Example 1 | Comparative Example 2 | Reference Example |
|---|---|---|---|---|---|---|---|---|---|---|
| Positively Chargeable Particles | Particle 1 | Particle 1 | Particle 2 | Particle 2 | Particle 2 | Particle 2 | Particle 1 | Particle 1 | Particle 1 | Particle 1 |
| Negatively Chargeable Particles | Particle 3 | Particle 4 | Particle 3 | Particle 4 | Particle 5 | Particle 6 | Particle 7 | Particle 5 | Particle 6 | Particle 8 |
| Display Characteristics at RT (23° C.) | 7.7 | 7.8 | 9.0 | 8.6 | 7.3 | 6.1 | 5.7 | 4.9 | 4.0 | 7.7 |
| Judgment | Pass | Pass | Pass | Pass | Pass | Pass | Pass | Fail | Fail | Pass |
| Display Characteristics at HT (50° C.) | 7.1 | 7.3 | 7.5 | 7.7 | 7.1 | 5.7 | 5.0 | 4.2 | 3.2 | 2.9 |
| Judgment | Pass | Pass | Pass | Pass | Pass | Pass | Pass | Fail | Fail | Fail |

It is apparent from the results of Table 3 that the examples (Examples 1 to 7), in which particles having two kinds of charge control agents are combined show higher display characteristics and better judgment than those of Comparative Examples 1 and 2 both at room temperature (23 degrees C.) and high temperature (50 degrees C.). Among Examples 1 to 7, it turns out that the examples (Examples 3 and 4), in which both of the positively chargeable particles and the negatively chargeable particles use particles having two kinds of charge control agents show particularly high display characteristics.

The reference example, in which a base resin having low glass transition temperature (Tg) is used shows inferior display characteristics at high temperature (50 degrees C.).

The information display panel using the particles for display media according to the present invention is applicable to the display unit for mobile equipment such as notebook personal computers, electronic databooks, PDAs (Personal Digital Assistants), cellular phones, handy terminal and so on; to the electric paper such as electric book, electric newspaper and so on; to the bulletin boards such as signboards, posters, blackboards (whiteboards) and so on; to the image display unit for electric calculator, home electric application products, auto supplies and so on; to the card display unit for point card, IC card and so on; to the display unit for electric advertisement, information boards, electric POP (Point Of Presence, Point Of Purchase advertising), electric price tags, electric shelf tags, electric musical scores, RF-ID devices and so on; and to the display unit for various electronic devices such as POS terminals, car navigation system devices, watches and so on. Moreover, the information display panel may be preferably used as a rewritable paper (which can be rewritten by means of an outside electrostatic field forming means).

The invention claimed is:

1. Particles for display media used for an information display panel, in which at least one kind of display media constituted as a group of particles including chargeable particles are sealed between two opposed substrates, at least one of the two substrates being transparent, and in which the display media are made to move so as to display information, wherein
   a particle for the display media comprises two or more kinds of charge control agents (CCA), a first one of the two or more kinds of CCA is positively chargeable and a second one of the two or more kinds of CCA is negatively chargeable.

2. The particles for display media according to claim 1, wherein
   the positively chargeable charge control agent is a salt comprising a compound containing a quaternary ammonium cation group and an anion, and
   the negatively chargeable charge control agent is a salt comprising a complex anion comprising a salicylic acid derivative and a metal atom, and a cation.

3. An information display panel, in which at least one kind of display media constituted as a group of particles including chargeable particles are sealed between two opposed substrates, at least one of the two substrates being transparent, and in which the display media, to which an electrostatic field is applied, are made to move so as to display information, wherein the particles for display media according to claim 1 are used.

* * * * *

UNITED STATES PATENT AND TRADEMARK OFFICE
CERTIFICATE OF CORRECTION

| | |
|---|---|
| PATENT NO. | : 8,144,386 B2 |
| APPLICATION NO. | : 12/441402 |
| DATED | : March 27, 2012 |
| INVENTOR(S) | : Norihiko Kaga, Kazuya Murata and Gaku Yakushiji |

It is certified that error appears in the above-identified patent and that said Letters Patent is hereby corrected as shown below:

Title Page, Item (22), "(22) PCT FILED:", please delete "Sep. 20, 2004" and insert --Sep. 20, 2007--.

Signed and Sealed this
Twelfth Day of March, 2013

Teresa Stanek Rea
*Acting Director of the United States Patent and Trademark Office*